United States Patent [19]
Lerner et al.

[11] Patent Number: 4,721,268
[45] Date of Patent: Jan. 26, 1988

[54] MODULAR POWER CORD AND CABLE ORGANIZER

[75] Inventors: Lawrence Lerner, Beverly Hills; Stephen P. Diskin, Los Angeles, both of Calif.

[73] Assignee: Mega/ERG Inc., Beverly Hills, Calif.

[21] Appl. No.: 916,865

[22] Filed: Oct. 9, 1986

[51] Int. Cl.⁴ .............................................. B65H 75/34
[52] U.S. Cl. ................................... 242/85.1; 242/129; 191/12.2 R
[58] Field of Search ................ 242/54 R, 68, 85, 85.1, 242/86, 96, 99, 100, 100.1, 100.2, 107.1; 191/12.2 R, 12.4

[56] References Cited

U.S. PATENT DOCUMENTS

| | | | |
|---|---|---|---|
| 2,351,379 | 6/1944 | Wehringer | 242/85.1 X |
| 2,364,262 | 12/1944 | Wehringer | 242/85.1 |
| 3,089,210 | 5/1963 | Ritter | 242/85.1 X |
| 3,290,453 | 12/1966 | Jensen | 242/85.1 X |
| 3,602,455 | 12/1969 | Lewis | 242/129 |

FOREIGN PATENT DOCUMENTS 2816266 10/1979 Fed. Rep. of Germany ..... 242/85.1

Primary Examiner—Donald Watkins
Attorney, Agent, or Firm—Charles H. Schwartz; Ellsworth R. Roston

[57] ABSTRACT

A modular power cord and cable organizer consisting of identical elongated containers which can be used singly or attached in multiple units, the combination of which creates a base upon which other objects or small electrical appliances may be placed for convenience. The device allows shortening and efficiently organizing power cords wires and cables especially where a group of small electrical components are used in combination and simultaneously as in, for example, data processing workstations or household work surfaces.

3 Claims, 6 Drawing Figures

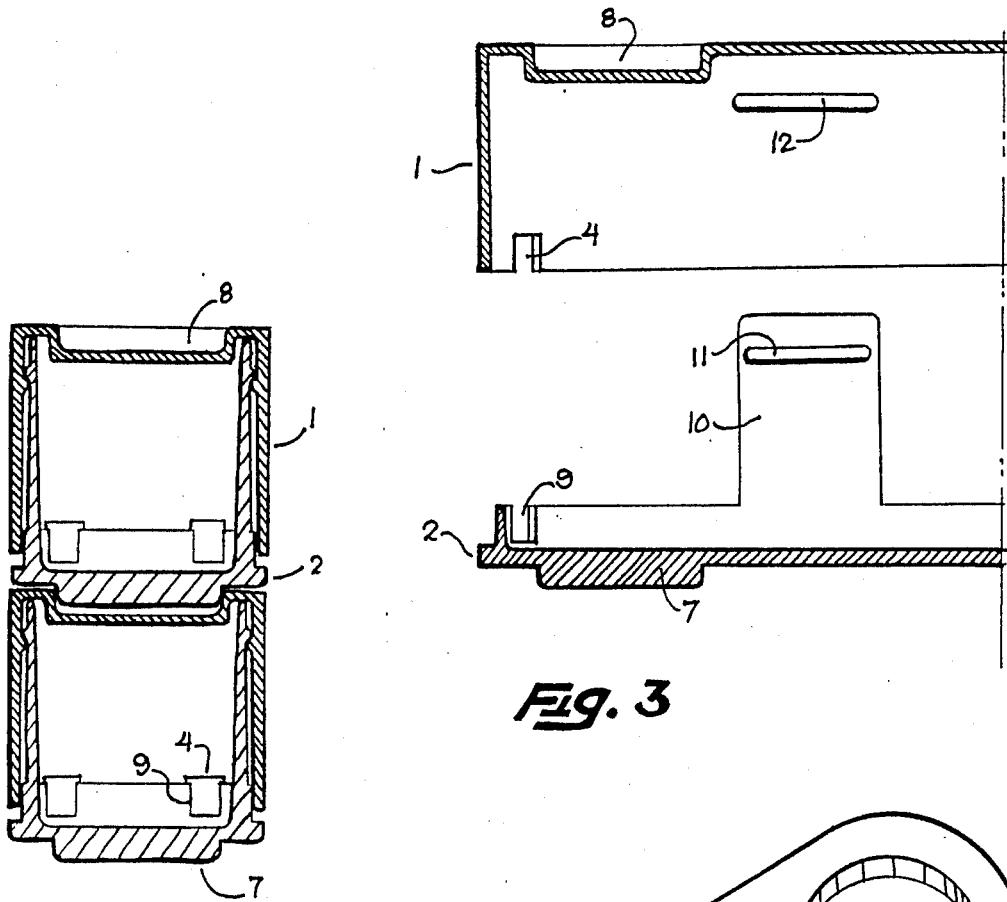
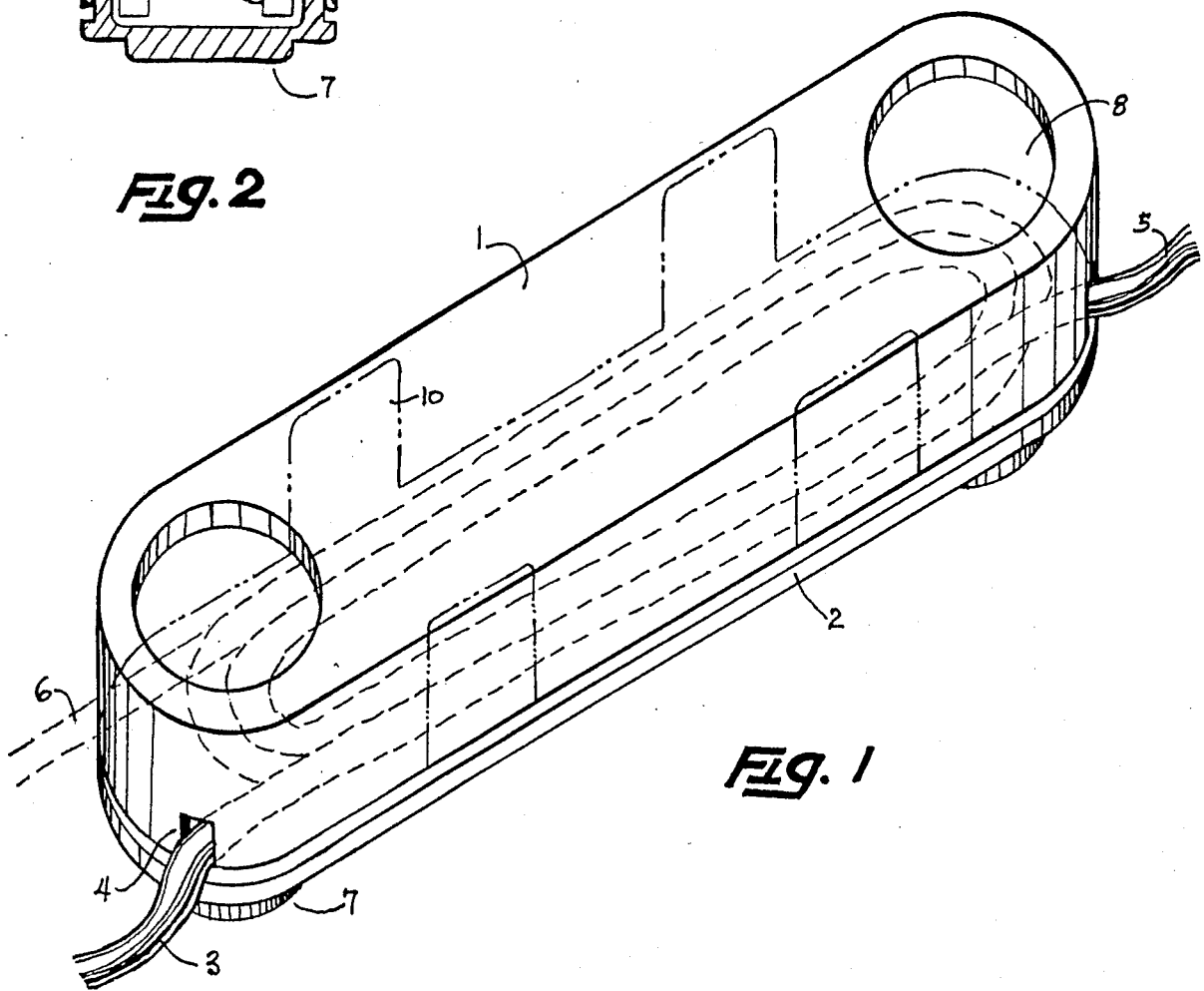

MODULAR POWER CORD AND CABLE ORGANIZER

BACKGROUND

The present invention is a solution to the problem of safe, efficient and neat organization of wires and power cords which accompany any small electrical appliances, and which are numerous where a group of electrical components are used together as an office desktop or computer workstation. Power cords and space connectors are of fixed length, leaving unsightly, confusing and potentially unsafe tangles of wiring. Although certain appliances have retractable cords, most have no such provision and, therefore, the ordinary stand-alone appliance would benefit by some means of routing, shortening and compactly storing the excess length of power cord. Many electrical devices also employ non-powered connectors, such as the coaxial cable connecting an antenna to a television. The present invention offers a comprehensive solution for cable shortening and management for individual cords, but more importantly, offers a system for handling many cords in an expandable device made up of identical units. Versatility of use and expandability thus render this invention unique, in addition to the fundamental features of the device: shortening and containing excess cords and cables so that these wires do not drape or intrude into areas where they might interfere with other objects (or with human users); efficiency (wires are more neatly and clearly organized for easier routing, substitution and replacement); and economy of space (the total number of wires crossing a desktop or other work surface is reduced, freeing that surface for use).

SUMMARY

The present modular power cord and cable organizer is meant to provide single and multiple containers for shortening, containing and organizing power cords cables and wires, especially that wiring which typically serves small electrical appliances or electronic devices. To achieve this, the present invention consists of only two component parts which may be snapped together to form one or more containers for wire. An agglomeration of several containers linked side by side may be mounted on a wall with a clip or directly to built-in hardware in manufactured office partition systems, or simply left resting on a horizontal work surface, where the device itself becomes a small platform on top of which a telephone or other similar small desktop appliance may be placed for convenience.

The device is used by neatly coiling a wire cable or cord within the enclosure of the base component. The user has the choice of how the wire enters and exits at the same end of the invention or at opposite ends. The device is closed by placing the cover component over the base. A friction or snap fit holds the cover in place. When more than one wire originates or terminates at a certain point, the multiple form of the device may be used. Wires are inserted into individual modules as described, then two or more modules may be fitted together to form a unit. The unit may be suspended or left flat on a horizontal surface as previously described.

The primary object of the invention is to be a modular expandable cable and wire organizer which manages and safely and efficiently holds and shortens to length any number of powered and non-powered wires, connectors and cables. Other objects and advantages will appear from the following description and with reference to the drawings.

BRIEF DESCRIPTION OF THE DRAWINGS

FIG. 1 is a perspective view of the present invention.

FIG. 2 is a transverse cross-sectional view of two modular power cord and cable organizers fitted one on top of the other.

FIG. 3 is a longitudinal cross section of both cover and base components of one module of the device.

DETAILED DESCRIPTION

Figure 4:
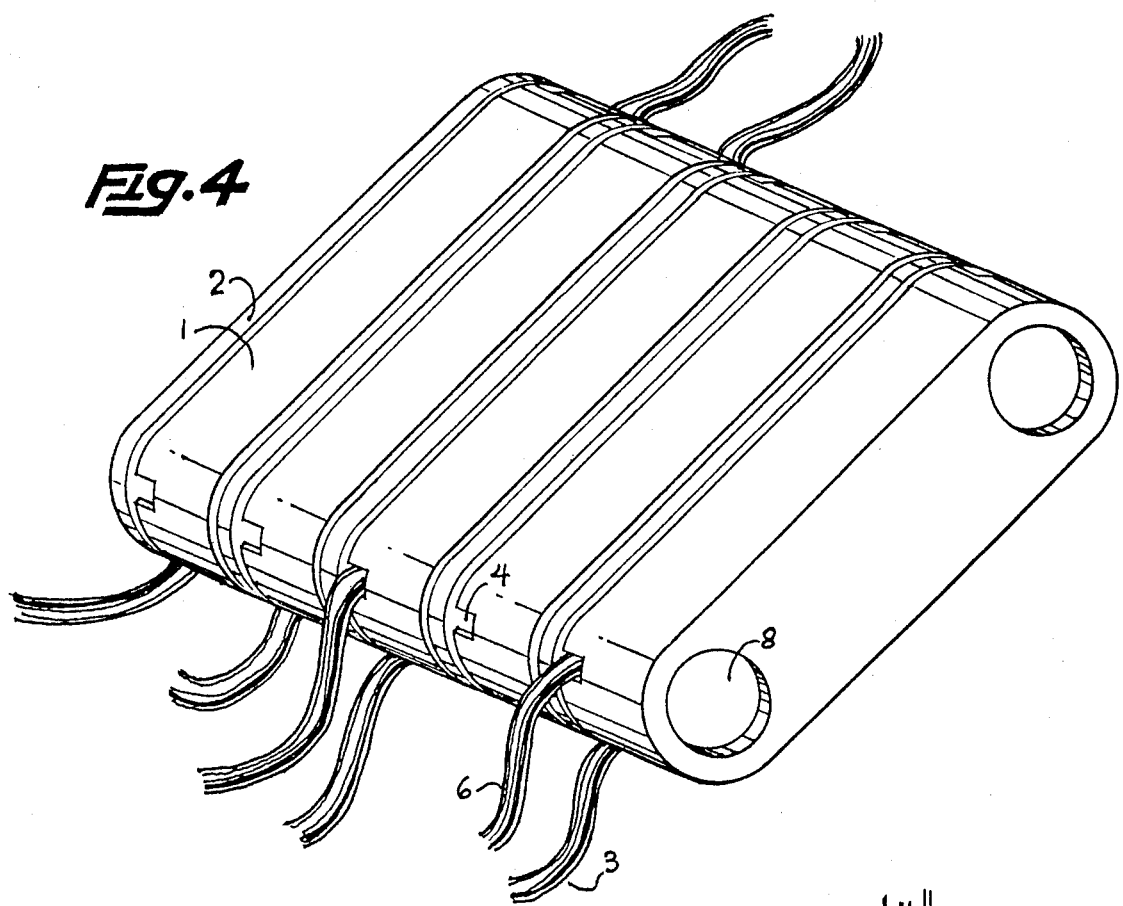
FIG. 4 shows an assemblage of five modules in a horizontal orientation which might occur on a typical work surface.

Referring now to the invention in more detail in FIG. 1, it can be seen that a single modular element of the present device consists simply of two components, a cover (1) and a base (2). Any reasonably sized power cord, connector, cable, or wire (3) desired may be stored, organized or shortened to exact length by inserting it into the base such that it will pass through openings in base (9) and cover (4). The wire is then coiled carefully within the base fitted between the four upright protrusions shown in dotted profile (10). An elongated coil shape is thus formed in the base and the inserted wire may then exit the device at the far end (5) or near end (6) as desired depending on usage and the origin and terminus of the wire. Small adjustments of the length of wire protruding from the device may easily be made by pushing the wire (3) into the opening (4) in the cover, or by withdrawing it. The interior of the device is intentionally free of obstructions to allow such adjustment of wire length.

The relationship of the cover component and base component of the invention is shown in FIG. 2 along with a second duplicate module to illustrate how all components join together. The cover component (1) fits tightly over the base component (2) forming a complete enclosure with a typical friction or snap fit. Openings (4, 9) in both components are positioned so as to align perfectly to create holes through which wires may pass. In addition, each component has two disk-like projections (7), one at each end of its long axis, which mate directly by-friction fit into similarly dimensioned and located apertures (8) in each cover component. In this manner, a multiplilcity of modules may be joined to form a device capable of compactly storing as many cable or wires as desired.

FIG. 3 shows a longitudinal cross section through cover (1) and base (2) components. Note particularly, in addition to features previously described, perimeter projetions (10) which occur at four symmetrical positions on the base component, which serve dual functions as guides in the formation of a neatly contained wire coil and also in firmly securing the cover to the base. Linear detents (11, 12) on both components serve to ensure a friction lock when the module is closed.

FIG. 4 illustrates the utility of the present invention when numerous modules are joined together. Note that the device is shown in a horizontal orientation as if on a worksurface, and that some wires enter and exit the device at the near end (3, 6) whereas others enter at the near end and exit at the far end, such as at the top center of FIG. 4. Typically, power cords will be configured in the latter arrangement.

Figure 5:
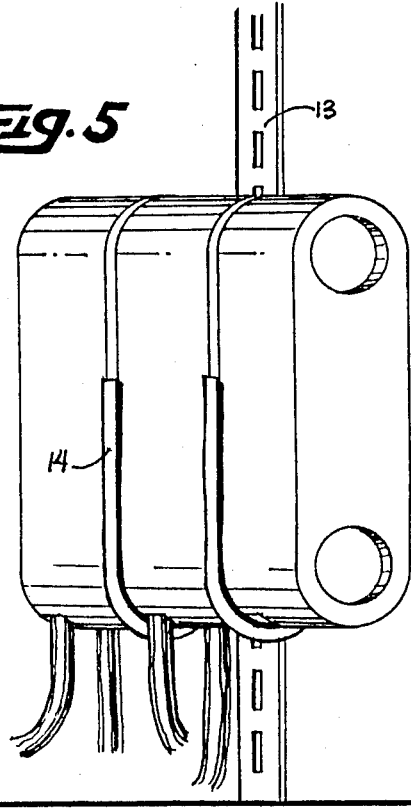
FIG. 5 indicates an assemblage of three modules in a vertical orientation supported by a bracket and mounted to a slotted track in a manufactured office partition.

An alternative mounting of the present multiple version of the invention is shown in FIG. 5. It is mounted vertically to a manufactured office partition surface using a special bracket (14). In this embodiment, the slotted track typical of most office system partitions is used to support the device; however, mounting to virtually any wall or partition surface is anticipated. In the vertical, partition-mounted orientation, the device is lifted off the adjacent worksurface anhd thus takes no desk space.

Figure 6:
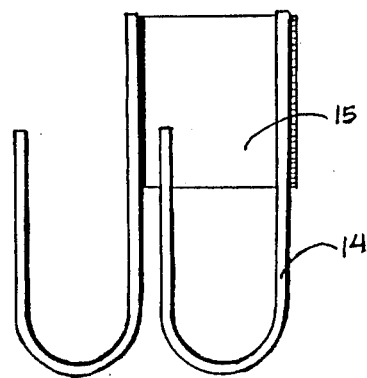
FIG. 6 shows a mounting bracket for supporting the invention on any vertical surface.

Finally, FIG. 6 shows a perspective view of the panel mounting bracket in which two parallel hook-like forms (14), contoured to the dimensions of the present invention, constitute a simple holder when attached to a mounting plate (15) which may be provided with pressure-sensitive adhesive for adhesion to wall surfaces or with mating hardware appropriate for connection to the slotted track of a standard manufactured office partition.

I claim:

1. A modular power cord and cable organizer including, a cover component and base component of substantially similar elongated dimensions, said cover component fitting over said base component and held together by friction fit to form an elongated container having a longitudinal axis, a pair of openings at each end of the longitudinal axis of said container to permit entry and exit of any of a variety of cables or power cords when the cables or power cords are coiled and inserted into said container, and connecting means located in said base and cover components to provide interconnection of a multiplicity of said containers into a single multiple-container device.

2. The modular power cord and cable organizer of claim 1 wherein each connecting means is formed by mating sets of protrusions and indentations to provide friction fit between said protrusions and indentations.

3. The modular power cord and cable organizer of claim 1 wherein a multiple of said organizers are provided and with each organizer mated to an adjacent organizer using the mating sets.

* * * * *